United States Patent [19]
Ohtsuka

[11] Patent Number: 6,154,258
[45] Date of Patent: Nov. 28, 2000

[54] METHOD AND DEVICE FOR DETECTING FLICKERS IN TELEVISION PICTURES

[75] Inventor: Yoshimichi Ohtsuka, Tokyo, Japan

[73] Assignee: Nippon Hoso Kyokai, Tokyo, Japan

[21] Appl. No.: 09/203,005

[22] Filed: Dec. 1, 1998

[30] Foreign Application Priority Data

Feb. 10, 1998 [JP] Japan .................................. 10-028840

[51] Int. Cl.$^7$ ...................................................... H04N 9/74
[52] U.S. Cl. ........................... 348/578; 348/226; 348/910
[58] Field of Search ..................... 348/578, 607, 348/608, 612, 624, 631, 687, 673, 688, 910, 722, 226; H04N 9/74, 8/21

[56] References Cited

U.S. PATENT DOCUMENTS 5,032,905  7/1991  Koga ........................................ 358/105
5,164,824  11/1992  Ieoka et al. ................................ 358/98
5,231,500  7/1993  Miyaji ...................................... 348/226

FOREIGN PATENT DOCUMENTS

| 0 068 420 A2 | 1/1983 | European Pat. Off. ......... H04N 9/28 |
| 0 720 367 A2 | 7/1996 | European Pat. Off. ......... H04N 7/01 |
| 39 24249 A1 | 1/1990 | Germany ......................... H04N 5/14 |
| 08-286651 | 11/1996 | Japan . |
| WO 90/15503 | 12/1990 | WIPO ............................. H04N 5/44 |
| WO 97/05598 | 2/1997 | WIPO ............................. G09G 5/36 |

*Primary Examiner*—Sherrie Hsia
*Attorney, Agent, or Firm*—Workman, Nydegger & Seeley

[57] ABSTRACT

A device that calculates a field difference by ROM and also a correlation between the calculated result and the delayed calculated result by ROM to detect one shot of flicker, and which uses a personal computer to examine the continued occurrence of the flicker-containing scene to make a final decision of the presence or absence of the flicker.

14 Claims, 5 Drawing Sheets

EXAMPLE OF EVALUATION FUNCTION BASED ON FIELD DIFFERENCE OR FRAME DIFFERENCE

| | |
|---|---|
| EXAMPLE 1 | Z=X-Y |
| EXAMPLE 2 | Z=(X-Y)/max(X,Y,20)*128 |
| EXAMPLE 3 | Z=(X-Y)/max((X+Y)/2,20)*64 |
| EXAMPLE 4 | ARITHMETIC MEAN OF EXAMPLE 1 AND EXAMPLE 3 |

NOTE THAT THE RANGES OF X AND Y ARE (0, 255), AND THE RANGE OF Z IS (-127, +127). Z IS CLIPPED AT THE UPPER LIMIT VALUE OR LOWER LIMIT VALUE SO THAT IT WILL NOT EXCEED THE RANGE.

X →/8→ [ROM] →/8→ Z
Y →/8→

METHOD AND DEVICE FOR DETECTING FLICKERS IN TELEVISION PICTURES

This application is based on Patent Application No. 10-028,840 (1998) filed Feb. 10, 1998 in Japan, the content of which is incorporated hereinto by reference.

BACKGROUND OF THE INVENTION

1. Field of the Invention

The present invention relates to a method and device for detecting flickers in television pictures.

2. Description of the Related Art

In the production of films and television programs, there is an editing technique of alternating two different scenes at one-frame intervals or at short time intervals to produce special effects. The similar effects may be achieved by a stroboscopic illumination. These scenes appear as striking flickers on the television screen and a viewer sensitive to the flickers of light, when watching these scenes, may have a fit or convulsion or complain about other physical anomalies.

To prevent such troubles, it is common practice to detect extreme flickers and, when they are found to exceed a warning level, issue an alarm to production staffs.

An example conventional technique for detecting flickers considers a flicker in terms of a change of scene or a cut and, when a series of such changes or cuts occur, decides that a flicker has occurred. If we let (i,j) stand for a spatial position in a present field or frame, $A_n(i,j)$ for its brightness, and $A_{n-1}(i,j)$ for the brightness of the same position one field or one frame previous, this technique evaluates a change of scene or a cut as expressed below:

$$\sum_i \sum_j |A_n(i,j) - A_{n-1}(i,j)| > T \qquad (1)$$

where T is an appropriately set threshold value. That is, the absolute value of a field difference or frame difference at the same position spanning successive fields or frames is integrated within the field or frame. When the integrated value exceeds a predetermined threshold, it is decided that the scene has been changed. When this change of scene, or cut, occurs successively, it is decided that a flicker is produced.

The conventional technique has a drawback that when there is a rapid motion in a scene or the scene is switched through fading, the field difference or frame difference occurs successively resulting in a false detection of flickers. Further, when one wishes to detect flickers down to small magnitudes, the value of T in the equation (1) needs to be set to a small value, making the motions in a scene and the overlap switching more likely to be detected as flickers undesirably.

SUMMARY OF THE INVENTION

The object of this invention is to provide a method and device for detecting flickers in television pictures which does not erroneously detect motions in a scene and an overlap switching as flickers According to the invention, a flicker detection method for television pictures which detects a flicker from a television video signal containing the flicker in which two shots are edited to alternate with each other at short intervals to produce a special effect of flicker, provides the steps of;

detecting as the flicker a portion of the television video signal that has a periodicity in chronological signal level changes; and outputting an alarm in response to the flicker detection.

According to the invention, the detection step may include: a step of outputting a value of a first evaluation function based on a field difference or frame difference of the television video signal; a step of delaying the value of the first evaluation function a plurality of fields or a plurality of frames to output a value of a second evaluation function based on a mathematical correlation between the value of the first evaluation function and the delayed value of the first evaluation function; a step of integrating the value of the second evaluation function within a field or frame and detecting one shot of flicker; and a step of detecting a chronological series of one-shot flickers.

According to the invention, the television video signal may be an NTSC signal or a signal produced by mixing three primary color signals of television at a predetermined ratio.

According to the invention, the flicker detection method for television pictures may further comprise the steps of, prior to executing the detection step, processing the television video signal by horizontal and vertical narrow band low-pass filtering (LPF), reducing the sampling frequency of and the number of lines of the LPF-processed signal, and then subjecting the signal obtained from these steps to the detection step.

According to the invention, various values of the first evaluation function may be stored in a nonvolatile memory in the form of a lookup table, a television video signal and a signal obtained by delaying the television video signal one field or one frame are given to the nonvolatile memory, and a value of the first evaluation function corresponding to a field difference or frame difference determined by the two signals is output from the nonvolatile memory.

According to the invention, various values of the second evaluation function may be stored in a nonvolatile memory in the form of a lookup table, a value of the first evaluation function and a signal obtained by delaying the value of the first evaluation function are given to the nonvolatile memory, and a value of the second evaluation function determined by the two signals is output from the nonvolatile memory.

According to the invention, the television video signal may be a signal of a plurality of colors obtained by mixing three primary color signals of television at a predetermined ratio, the flicker detection step is performed for each of the plurality of colors, and the largest of the detected flickers for each color is used as a final flicker.

According to the invention, a flicker detection device for television pictures which detects a flicker from a television video signal containing the flicker in which two shots are edited to alternate with each other at short intervals to produce a special effect of flicker, provides;

detection means for detecting as the flicker a portion of the television video signal that has a periodicity in chronological signal level changes; and output means for outputting an alarm in response to the flicker detection.

According to the invention, the detection means may comprise; first means for outputting a value of a first evaluation function based on a field difference or frame difference of the television video signal; second means for delaying the value of the first evaluation function a plurality of fields or frames to output a value of a second evaluation function based on a mathematical correlation between the value of the first evaluation function and the delayed value of the first evaluation function; third means for integrating the value of the second evaluation function within a field or frame and detect one shot of flicker; and fourth means for detecting a chronological series of one-shot flickers.

According to the invention, the television video signal may be an NTSC signal or a signal produced by mixing three primary colors of television at a predetermined ratio.

According to the invention, the flicker detection device for television pictures may further comprise; fifth means for processing the television video signal by horizontal and vertical narrow band low-pass filtering (LPF); and sixth means for reducing the sampling frequency of and the number of lines of the LPF-processed signal, wherein the signal obtained by the sixth means is supplied to the detection means.

According to the invention, the first means may be a nonvolatile memory which stores various values of the first evaluation function in the form of a lookup table, and a television video signal and a signal produced by delaying the television video signal one field or frame are given to the nonvolatile memory to output from the nonvolatile memory a value of the first evaluation function corresponding to a field difference or frame difference determined by the two signals.

According to the invention, the second means may be a nonvolatile memory which stores various values of the second evaluation function in the form of a lookup table, and a value of the first evaluation function and a signal produced by delaying the value of the first evaluation function are given to the nonvolatile memory to output from the nonvolatile memory a value of the second evaluation function determined by the two signals.

According to the invention, the television video signal may be a signal of a plurality of colors obtained by mixing three primary color signals of television at a predetermined ratio, flickers are detected for each of a plurality of colors by a plurality of the detection means, and the largest of the detected flickers for each color is used as a final flicker.

This invention has the following features. The inventor of this invention has found that there is a periodicity of picture change in a flicker, i.e., in an edited part of a video where two scenes are alternated at short intervals. The invention detects a flicker in the television picture by taking advantage of this periodic nature and thus greatly reduces erroneous detection of flickers compared with the conventional method that detects only picture changes. To detect periodicity of picture change, a mathematical correlation (or an evaluation function derived by transforming the correlation) between a field difference or frame difference and a corresponding field difference or frame difference after some delay is used. According to the invention, to simplify the flicker detection processing, television video signals are reduced in the sampling frequency (down-sampling) and in the number of lines (down-lining), or calculation of field difference or frame difference and of mathematical correlation is performed by using a read-only memory. Further, by using luminance signals and particular mixed color signals of the television video signals, this invention can detect general flickers and flickers of a particular color.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

Now, by referring to the accompanying drawings embodiments of this invention will be described in detail.

The flicker as it is referred to in this invention is produced by two scenes edited to alternate at short intervals. From this flicker definition, it follows that when a scene changes in a brighter direction at a given time, it is expected to change in a darker direction with some delay. Conversely, when a scene changes in a darker direction at a given time, it is expected to change in a brighter direction after some delay. Based on this reasoning, the flicker detection of this embodiment checks whether or not the brightness of a scene, after it has changed, returns to its original level with some delay. Here, the change of brightness in a scene means a field difference or frame difference. As to the return to the original level of brightness, it is decided that the brightness has returned to the original level if the correlation, which is calculated between a field difference or frame difference and the corresponding field difference or frame difference with an appropriate delay time, is found to be strongly negative. When such a brightness change and a return to the original luminance level occur frequently, i.e., when there is a periodicity in the brightness change, it is determined that a flicker has occurred.

Figure 1:
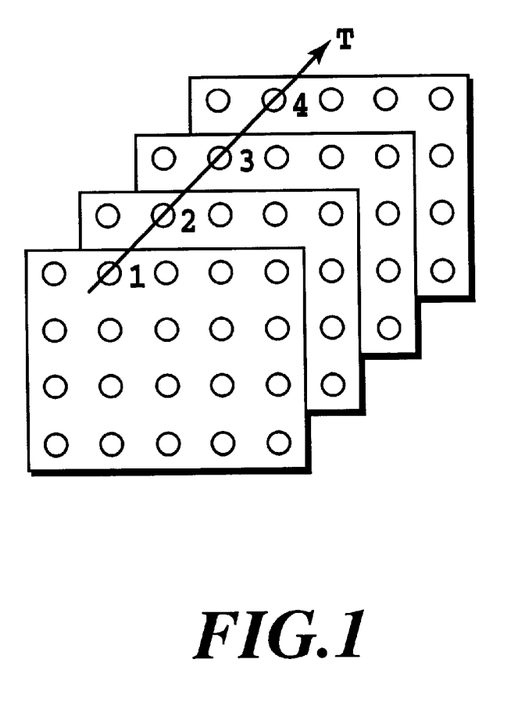
FIG. 1 is a schematic diagram showing a structure of frames of a video.
Figure 2:
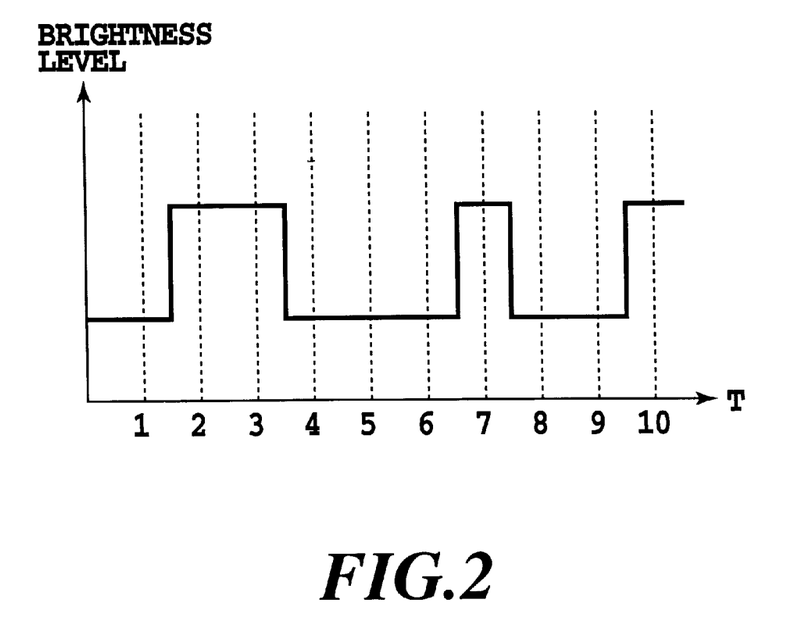
FIG. 2 is a waveform diagram showing a principle of the flicker detection according to an embodiment of the invention.

Next, the flicker detection method of this embodiment will be described. FIG. 1 shows a frame structure of a scene (which may be read as a field structure: in that case the word "frame" in the following description shall be read as "field"). In the figure, blank circles (symbols of ○) and filled or solid circles (symbols of ●) represent picture elements or pixels, and the video has a sampling structure in which sampling is performed in horizontal, vertical and time-axis directions. The brightness of a solid circle plotted in the time (t) direction is shown in FIG. 2. When the brightness or luminance changes from frame 1 (t=1) to frame 2 (t=2) and returns to the original level as the frame shifts from frame 3 (t=3) to frame 4 (t=4), one cycle of flicker is detected. When this brightness change and return occurs successively, it is decided that a flicker has occurred.

The brightness change can be represented simply by a frame difference. The frame difference $D_n(i,j)$ at a position (i,j) in a frame n can be expressed as $$D_n(i,j)=A_n(i,j)-A_{n-1}(i,j) \tag{2}$$

where $A_n(i,j)$ is a luminance level at a position (i,j) on an n-th frame, and $A_{n-1}(i,j)$ is a luminance level at the same position one frame previous. Similarly, the frame difference on an (n−k)th frame is expressed as $$D_{n-k}(i,j)=A_{n-k}(i,j)-A_{n-k-1}(i,j) \tag{3}$$

When $D_n(i,j)$ and $D_{n-k}(i,j)$ have opposite signs, it can be interpreted that the brightness changed but returned to the original level k frames later. In this case, therefore, one cycle of flicker at the pixel (i,j) is detected. The necessary condition for the flicker occurrence is that there be many such pixels in the frame. The evaluation function of flicker is defined as follows using a mathematical correlation function.

$$E_n = \frac{1}{N} \sum_i \sum_j D_n(i, j) D_{n-k}(i, j) \quad (4)$$

where N is the total number of pixels in the frame. When this correlation function has a large negative value, this represents one cycle of flicker. When such a state occurs successively over time, it is decided that a flicker has occurred.

The field difference or frame difference plays an important role in the detection of flicker. This value should be as close to a stimulus for humans as possible. Suppose brightness changes of the same magnitudes occur in a light region and in a dark region. Although these changes are equal in magnitude, humans are more sensitive to the brightness change in the dark region. Hence, the brightness change is normalized by luminance level. For example, $$D_n(i, j) = \frac{A_n(i, j) - A_{n-1}(i, j)}{\max\{A_n(i, j), A_{n-1}(i, j), A_0\}} \times B \quad (5)$$

where $A_0$ is a predetermined threshold value to prevent a possible deterioration of precision that can occur when a numerator becomes small, and B is a constant to adjust the dynamic range of a calculation circuit. When, for example, the luminance level is represented by 8 bits (0–255) and $D_n(i,j)$ by 8 bits (−127–+127), it is appropriate to set $A_0$ to about 10% of the maximum luminance level or $A_0$=20–25, and B is appropriately set at a value such that the equation (2) will not be clipped whatever values $A_n(i,j)$ and $A_{n-1}(i,j)$ may take, or B=128. In actual hardware, this portion is formed by a read-only memory (ROM) with a 16-bit input and an 8-bit output. Hence, there are many possible variations involving the field difference or frame difference.

The equation (4) for calculating the correlation has an evaluation value expressed in energy (electric power). Therefore, it has a drawback that it fails to react to a small amplitude of $D_n(i,j)$ and $D_{n-1}(i,j)$ but reacts sharply to a large amplitude. For this reason, in order to change the unit of evaluation value from energy to amplitude and to decide that one cycle of flicker is detected when the evaluation value is a large positive value, the evaluation function based on the correlation is modified as follows.

$$E_n = \frac{1}{N} \sum_i \sum_j f(D_n(i, j), D_{n-k}(i, j)) \quad (6)$$

$$f(x, y) = \begin{cases} C\sqrt{(-xy)} & \text{if } (xy < 0) \\ 0 & \text{if } (xy \geq 0) \end{cases}$$

where C is a constant to adjust the dynamic range of the output and is appropriately set at C=2 as the constant for which the output is not clipped when the two inputs are 8 bits (−127–+127) and the output is 8 bits (0–255). This portion, too, may advantageously be formed by a read-only memory (ROM) with a 16-bit input and an 8-bit output. There are many possible variations.

In the above equation, k represents a delay time which elapses from the moment when the luminance level changes to the moment when it returns to the original level and is expressed as an integer multiple of the field or frame period. It should be noted that the delay time is not always constant. When, for example, the flicker frequency ranges from 3 Hz to 30 Hz, the value of k must cover all delays from one field to 10 fields. In the embodiment that follows, the correlation evaluation is calculated for all delays k of 1–13 fields.

Figure 3:
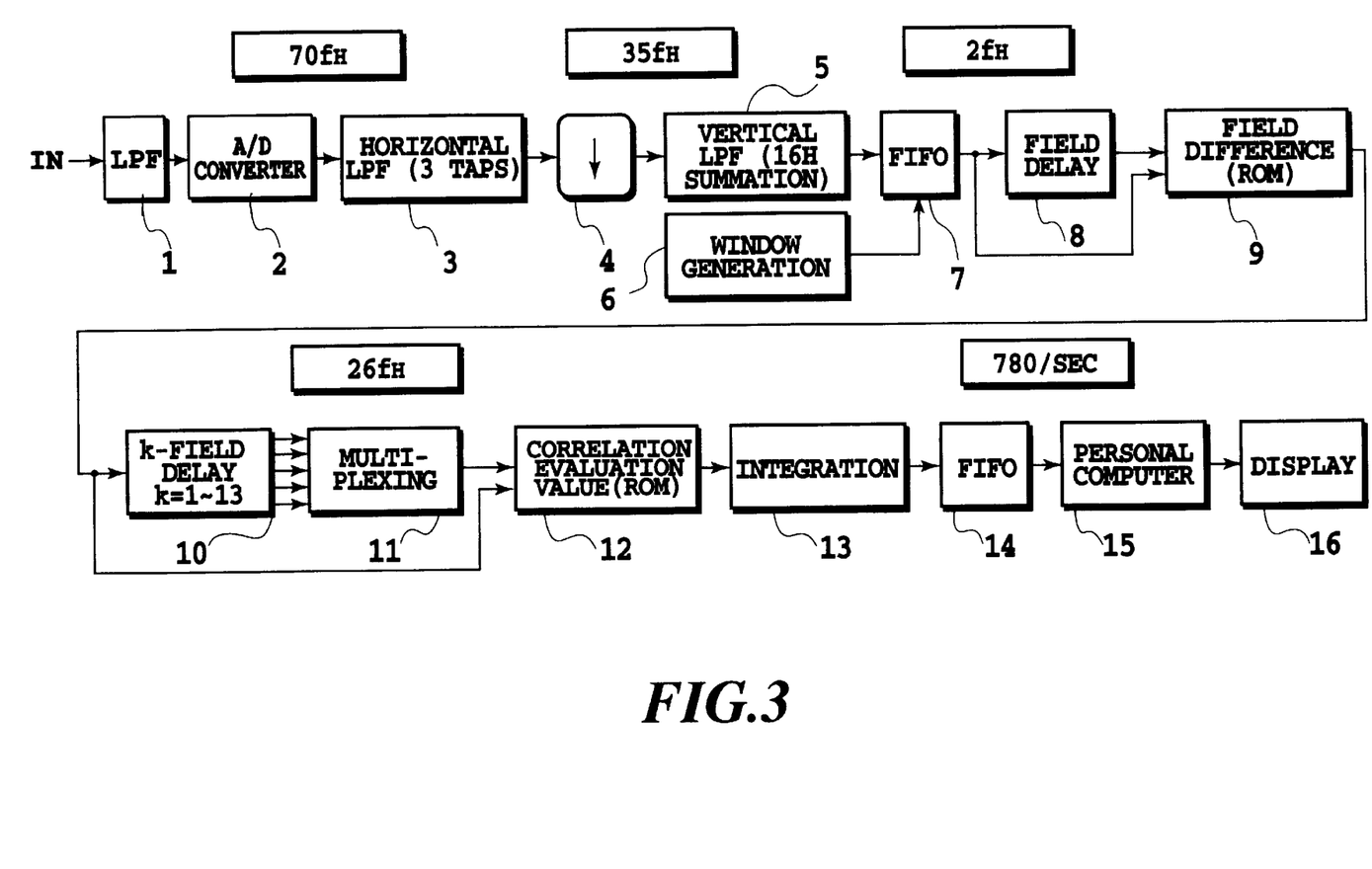
FIG. 3 is a block diagram showing a circuit configuration according to the embodiment of the invention.

FIG. 3 shows an example configuration of a flicker detection device that uses the above flicker detection method. This device was actually manufactured and has been verified to be operational in good condition.

An input signal (IN) is an NTSC signal or a signal mixing three primary color signals (red, green, blue) of television at an appropriate ratio. The reason that the three primary color signals of television are mixed at an appropriate ratio is that the three primary colors of film (magenta, cyan, yellow) differ from those of television and that a magenta-cyan color axis is often used for flicker detection. This embodiment, therefore, is characterized by "the use of an NTSC signal as an input signal or by the use of a signal that mixes three primary color signals (red, green, blue) of television at an appropriate ratio."

The input signal (IN) is passed through a low-pass filter (LPF) 1 before being digitized by an A/D converter 2. The flicker detection of this embodiment detects a large area flicker and may have a significantly low spatial resolution. For this reason, the clock frequency of the A/D converter 2 is set to 70 times the line frequency ($f_H$). At this time, the sampling frequency is about 1.1 MHz, and the band of LPF 1 is some 0.5 MHz. The A/D converter 2 has an 8-bit width and its input is adjusted so that a black signal results in a digital level of 0 (zero) and a white peak results in a digital level of 255.

The output of the A/D converter 2 is passed through a simple horizontal LPF (tap coefficients: ¼, ½, ¼) 3 and then the sampling frequency is down-sampled to half by a sampling circuit 4. As a result, the sampling frequency is reduced to 35 $f_H$. Next, the signal is passed through a vertical LPF comprising a 16-line summation 5 that reduces the number of lines to one line for every ten lines. The down-line operation is controlled by a window generation (generator) 6, which at the same time eliminates the blanking period of the video. The window generation generates a window that down-lines the vertical active line number to 21 lines per field with the horizontal active pixel number set to 25 pixels. During the window period, the video is written into a first-in-first-out memory (FIFO) 7. The video written into the FIFO 7 has 25 pixels×21 lines=525 samples/field. Thus, this embodiment is characterized in that "the video signal is passed through the horizontal and vertical narrow-band LPF's for reducing the sampling frequency and the number of lines."

Figure 4:
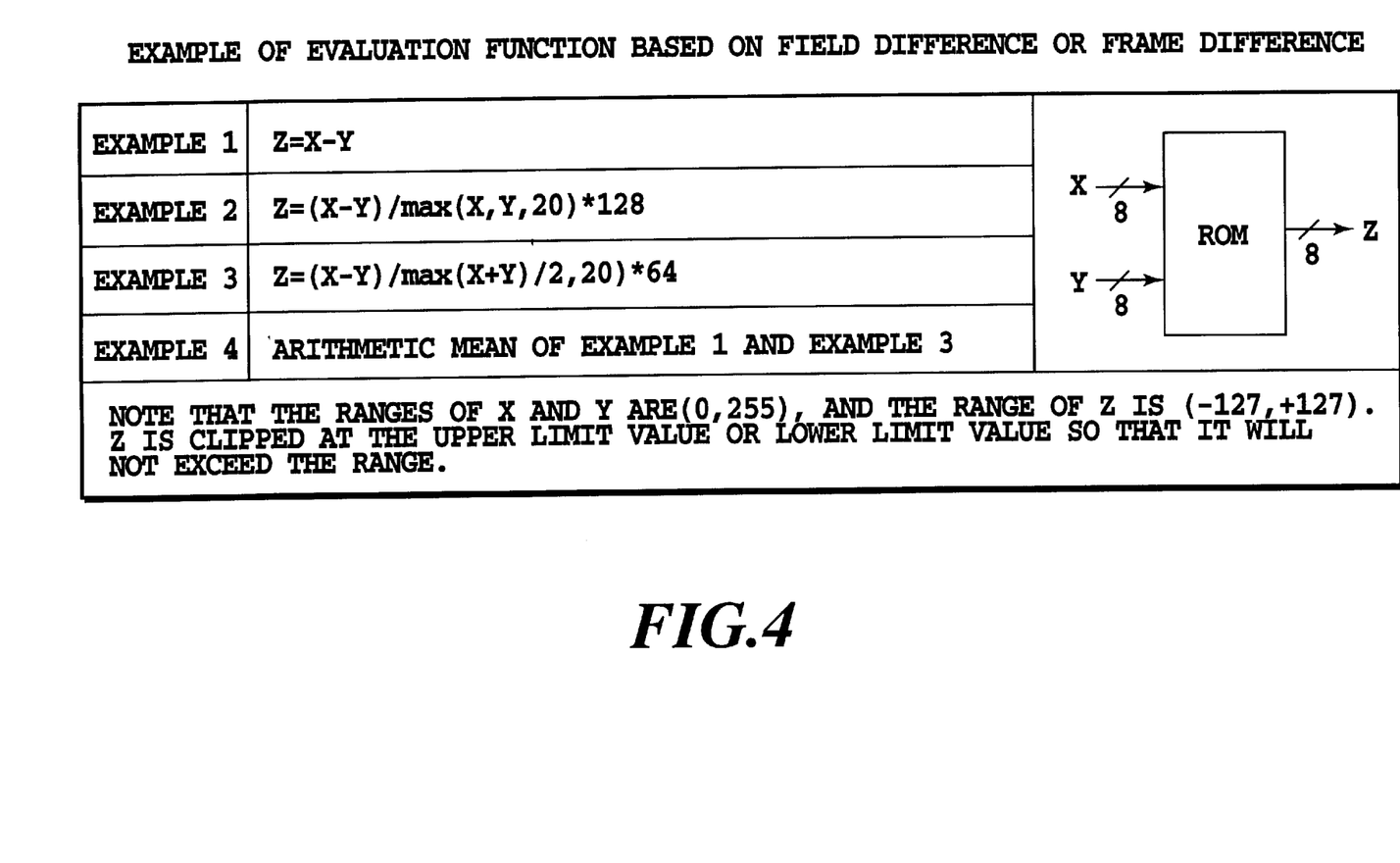
FIG. 4 is a table showing the contents of processing performed by a ROM 9.

The signal written into the FIFO 7 is read out at the rate of 2 $f_H$ and sent to a field delay (circuit) 8. The output of the FIFO 7 and the output of the field delay 8 are converted by a read-only memory (ROM) 9 into values of the evaluation function based on field difference. The evaluation function, as described earlier, does not need to be a field difference but may be selected from among a variety of other possible forms of value, such as a value obtained by normalizing the field difference by luminance level. Conceivable variations of the evaluation function are shown in FIG. 4. This embodiment, therefore, is characterized by "the first evaluation function based on a field difference or frame difference" and also characterized in that "the first evaluation function based on the field difference or frame difference is generated by a read-only memory (ROM)."

Figure 5:
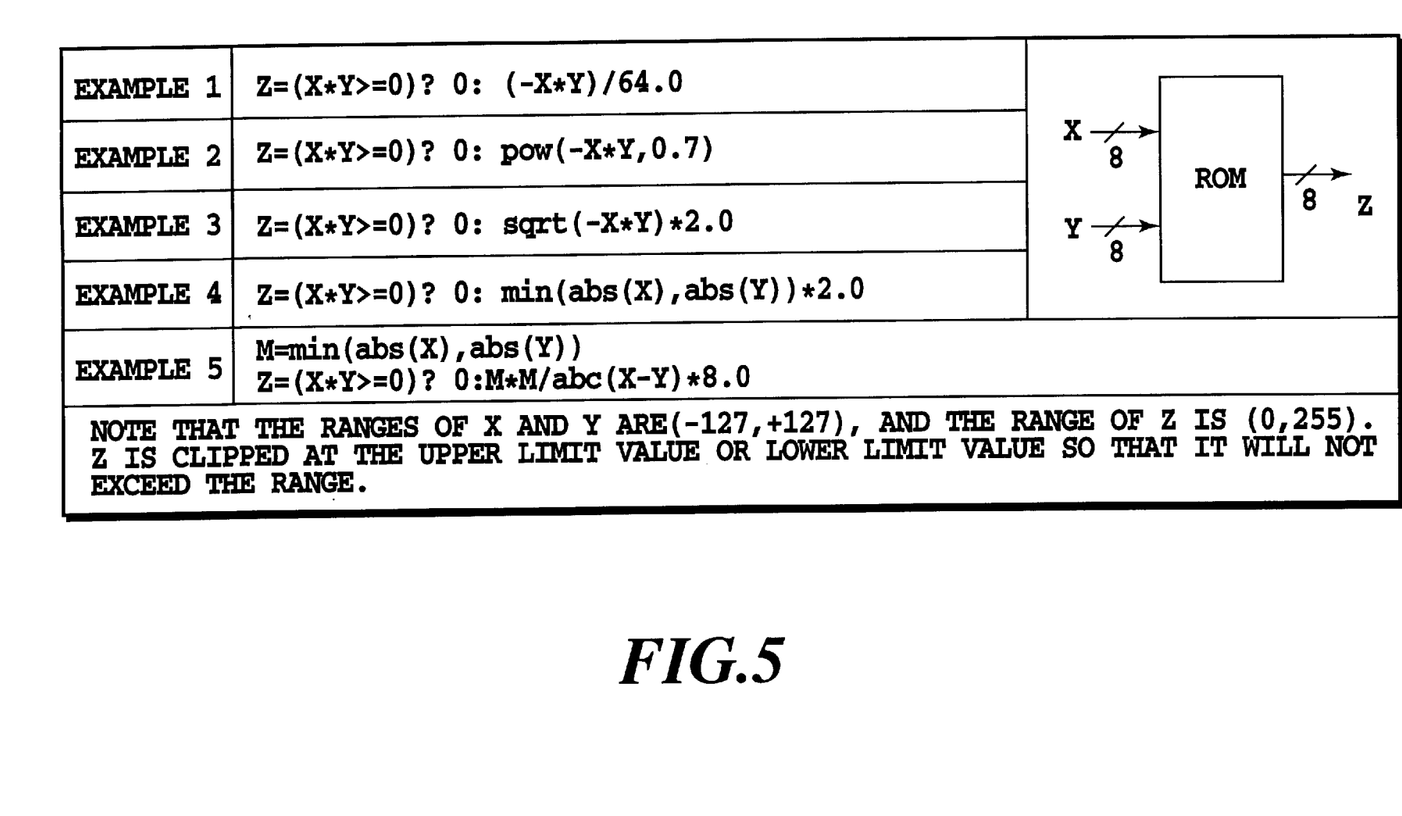
FIG. 5 is a table showing the contents of processing performed by a ROM 12.

The value of the evaluation function based on the field difference is delayed k fields (k=1 to 13), and an evaluated value of correlation between each delayed signal and the original signal is output. The term correlation as used in mathematics normally is defined as the sum of products of two signals, and the evaluated value of correlation is defined as a product of the delayed signal and the original signal. If, however, the evaluated value of correlation is defined as a product, the value is expressed in energy (electric power) and, as explained earlier, has a drawback of failing to react to a small frame difference. Here, the evaluated value of correlation is defined as follows. That is, when the polarities of the delayed signal and the original signal have the same signs, a value 0 (zero) is output. When these polarities have the opposite signs, a value obtained by taking a square root of the product attached with a minus sign (−) is output. Thus, the correlation evaluation value is output as a signal expressed in amplitudes rather than energy. There are other possible variations for the evaluation value as shown in FIG. 5 and a second evaluation function may advantageously be generated by a ROM 12. Thus, this embodiment is characterized in that "the first evaluation function is delayed a plurality of fields or frames and a signal of the first evaluation function and a signal of the delayed first evaluation function are received and correlated to output a second evaluation function based on correlation." This embodiment is also characterized in that "a second evaluation function is generated by a read-only memory (ROM)."

The second correlation evaluation value is produced for each of k field delays (k=1 to 13) and is integrated within each of the fields (525 fields) for each delay. The delays from the k-field delay 10 are each multiplexed by a multiplexing circuit 11 into a single signal to enable the correlation evaluation value to be generated and integrated for each delay by one circuit (integration circuit 13), which in turn simplifies the configuration of the device.

The correlation evaluation value for each delay is taken into a personal computer 15, which displays the correlation evaluation value on a display 16 such as oscilloscope. When it detects that the correlation evaluation value exceeds a preset threshold value and this event occurs successively over a length of time, the personal computer 15 calculates the flicker frequency and the duration of such an event and, when the frequency and the duration exceed predetermined warning levels, issues an alarm. The personal computer 15 also has a function of automatically recording alarm events in a file. These functions performed by a personal computer can use a known existing technique.

Of the flicker scenes that are made by alternating two different shots at short intervals, some exhibit changes only in color but not in luminance level. A single device that uses the NTSC signal or luminance signal as an input signal cannot detect such flickers. To deal with this problem, two or three flicker detection devices having the same characteristics and the system configuration of FIG. 3 are prepared. New three primary color signals produced by mixing the three primary color signals of television at an appropriate mixture ratio are supplied to each of the flicker detection devices. Of the two or three flicker detection devices, a device that has detected a largest flicker is allowed to produce an overall flicker output. This embodiment is shown in FIG. 6.

Figure 6:
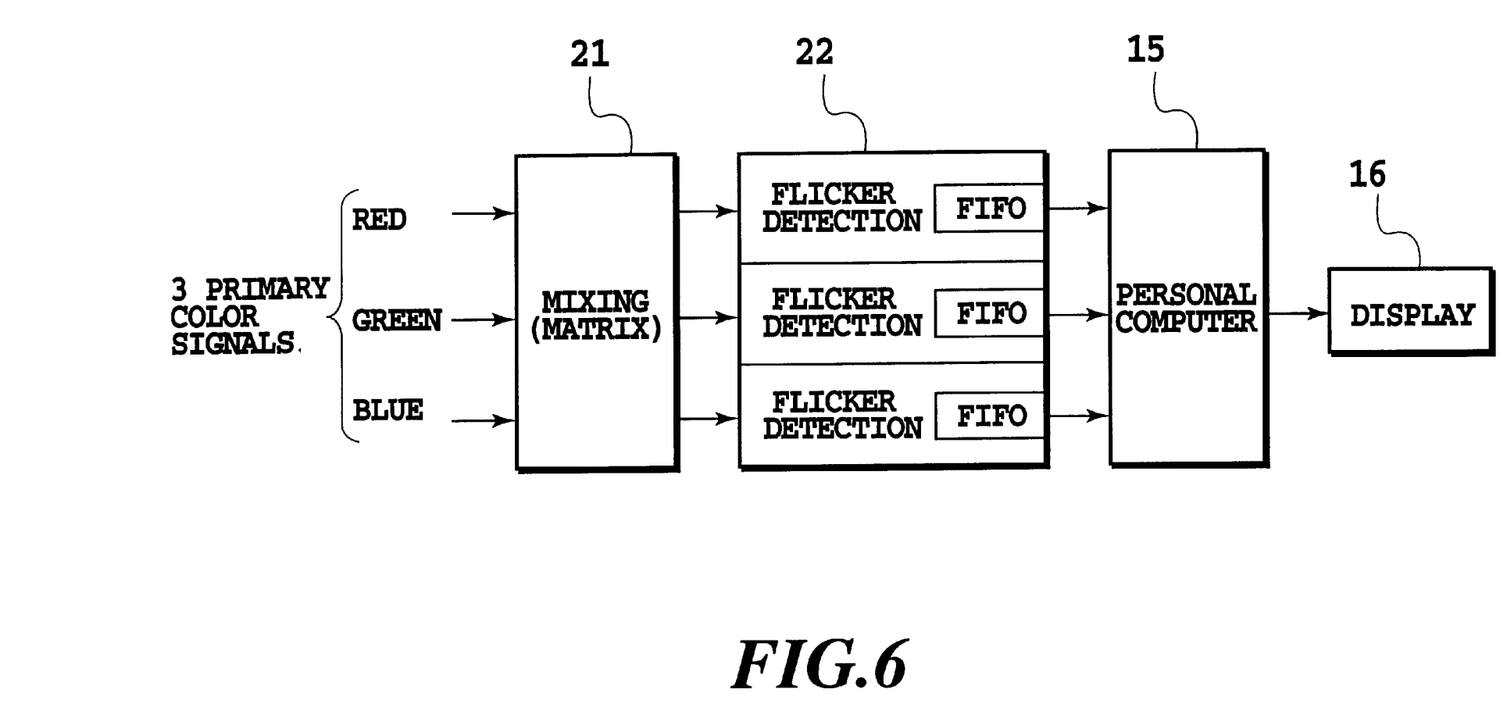
FIG. 6 is a block diagram showing another example configuration of the flicker detection device.

In FIG. 6, television's three primary color signals (red, green, blue) are mixed by a matrix 21 by multiplying them with appropriate weight coefficients (negative coefficients may also be used) and summing the multiplied results. The matrix used here does not need to be a matrix used by the NTSC encoder that generates YUV from RGB. When three flicker detection devices 22 are used, there is no problem with the use of three primary color signals such as RGB signals or YUV signals. When two flicker detection devices are used, however, it would be appropriate to use one device for a Y signal and the other for a magenta-cyan signal, for example, an R-B mixed signal. The flicker detected by two or three devices is taken into the personal computer 15 via the second FIFO 14 in FIG. 3. The personal computer 15 needs only to display the greatest flicker as an overall flicker detection signal. Thus, this embodiment is also characterized in that "two or three flicker detection devices 22 of the same configurations are prepared, that two or three signals that are produced by mixing the television's three primary color signals at an appropriate mixture ratio are supplied to the two or three flicker detection devices 22, and that the detection device that has detected the largest flicker is allowed to produce its output as an overall flicker detection output of the two or three detection devices."

As described above, to detect a flicker caused by two shots edited to alternate with each other at short intervals, this embodiment takes advantage of the nature of a flicker that in a flicker scene of a television video a quantity which has changed returns to the original level with a certain delay time, and thereby provides a new flicker detection method or device that is based on a mathematical correlation, or an evaluation function derived by transforming the correlation, between a field difference or frame difference and a corresponding field difference or frame difference after some delay.

The flicker can be treated as a large-area flicker. Hence, an input signal can be processed by narrow band low-pass filters to achieve significant reductions in the sampling frequency (down sampling) and in the number of lines (down lining). The evaluation function based on the field difference or frame difference or on correlation, the core of this invention, is generated by a ROM to simplify hardware significantly. By taking correlation evaluation values into a personal computer, a visual display can be made. With a personal computer it is also possible to preset warning conditions and, when these conditions are exceeded, issue an alarm and record alarm events in a file.

It should be noted that the luminance level in the above description does not need to be restricted to a narrow sense of the word as used in the color optics and that the luminance level can be read as a signal level in a variety of video signals.

Finally, the above embodiments were actually manufactured into hardware and its performance was verified to be capable of detecting flickers with a satisfactory precision.

In addition to the above embodiments, this invention can also be implemented in the following embodiments.

1) While the above embodiments form the flicker detection device by using a plurality of digital circuits, the function of the digital circuits can be realized by software of the personal computer 15.

2) While in the above embodiments the circuits 9, 12 use a ROM, a nonvolatile memory such as EEPROM can also be used.

3) The ROM 9, 12 store, in the form of a lookup table, values to be output. The lookup table is a table which stores the value Z of a formula shown, for instance, in the example 1 of FIG. 4 in a memory location determined by X and Y. Hence, giving the ROM the values of X and Y to be substituted in the formula as addresses will result in the value of Z being read out from the corresponding location and output from the ROM.

Although a predetermined calculation formula (see FIGS. 4 and 5) may be calculated by a computation circuit instead of using the ROM 9, 12, the calculation speed is faster when ROM is used.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A flicker detection method for television pictures which detects a flicker from a television video signal containing the flicker in which two shots are edited to alternate with each other at short intervals to produce a special effect of flicker, comprising the steps of;

detecting as the flicker a portion of the television video signal that has a periodicity in chronological signal level changes; and outputting an alarm in response to the flicker detection.

2. A flicker detection method for television pictures as claimed in claim 1, wherein the detecting step includes: a step of outputting a value of a first evaluation function based on a field difference or frame difference of the television video signal; a step of delaying the value of the first evaluation function a plurality of fields or a plurality of frames to output a value of a second evaluation function based on a mathematical correlation between the value of the first evaluation function and the delayed value of the first evaluation function; a step of integrating the value of the second evaluation function within a field or frame and detecting one shot of flicker; and a step of detecting a chronological series of one-shot flickers.

3. A flicker detection method for television pictures as claimed in claim 2, wherein the television video signal is an NTSC signal or a signal produced by mixing three primary color signals of television at a predetermined ratio.

4. A flicker detection method for television pictures as claimed in claim 2, further comprising the steps of, prior to executing the detecting step, processing the television video signal by horizontal and vertical narrow band low-pass filtering (LPF), reducing the sampling frequency of and the number of lines of the LPF-processed signal, and then subjecting the signal obtained from these steps to the detecting step.

5. A flicker detection method for television pictures as claimed in claim 2, wherein various values of the first evaluation function are stored in a nonvolatile memory in the form of a lookup table, a television video signal and a signal obtained by delaying the television video signal one field or one frame are given to the nonvolatile memory, and a value of the first evaluation function corresponding to a field difference or frame difference determined by the two signals is output from the nonvolatile memory.

6. A flicker detection method for television pictures as claimed in claim 2, wherein various values of the second evaluation function are stored in a nonvolatile memory in the form of a lookup table, a value of the first evaluation function and a signal obtained by delaying the value of the first evaluation function are given to the nonvolatile memory, and a value of the second evaluation function determined by the two signals is output from the nonvolatile memory.

7. A flicker detection method for television pictures as claimed in claim 2, wherein the television video signal is a signal of a plurality of colors obtained by mixing three primary color signals of television at a predetermined ratio, the flicker detection step is performed for each of the plurality of colors, and the largest of the detected flickers for each color is used as a final flicker.

8. A flicker detection device for television pictures which detects a flicker from a television video signal containing the flicker in which two shots are edited to alternate with each other at short intervals to produce a special effect of flicker, comprising;

detection means for detecting as the flicker a portion of the television video signal that has a periodicity in chronological signal level changes; and output means for outputting an alarm in response to the flicker detection.

9. A flicker detection device for television pictures as claimed in claim 8, wherein the detection means comprises; first means for outputting a value of a first evaluation function based on a field difference or frame difference of the television video signal; second means for delaying the value of the first evaluation function a plurality of fields or frames to output a value of a second evaluation function based on a mathematical correlation between the value of the first evaluation function and the delayed value of the first evaluation function; third means for integrating the value of the second evaluation function within a field or frame and detect one shot of flicker; and fourth means for detecting a chronological series of one-shot flickers.

10. A flicker detection device for television pictures as claimed in claim 9, wherein the television video signal is an NTSC signal or a signal produced by mixing three primary colors of television at a predetermined ratio.

11. A flicker detection device for television pictures as claimed in claim 9, further comprising; fifth means for processing the television video signal by horizontal and vertical narrow band low-pass filtering (LPF); and sixth means for reducing the sampling frequency of and the number of lines of the LPF-processed signal, wherein the signal obtained by the sixth means is supplied to the detection means.

12. A flicker detection device for television pictures as claimed in claim 9, wherein the first means is a nonvolatile memory which stores various values of the first evaluation function in the form of a lookup table, and a television video signal and a signal produced by delaying the television video signal one field or frame are given to the nonvolatile memory to output from the nonvolatile memory a value of the first evaluation function corresponding to a field difference or frame difference determined by the two signals.

13. A flicker detection device for television pictures as claimed in claim 9, wherein the second means is a nonvolatile memory which stores various values of the second evaluation function in the form of a lookup table, and a value of the first evaluation function and a signal produced by delaying the value of the first evaluation function are given to the nonvolatile memory to output from the nonvolatile memory a value of the second evaluation function determined by the two signals.

14. A flicker detection device for television pictures as claimed in claim 9, wherein the television video signal is a signal of a plurality of colors obtained by mixing three primary color signals of television at a predetermined ratio, flickers are detected for each of a plurality of colors by a plurality of the detection means, and the largest of the detected flickers for each color is used as a final flicker.

* * * * *

UNITED STATES PATENT AND TRADEMARK OFFICE
CERTIFICATE OF CORRECTION

PATENT NO.    : 6,154,258
DATED         : November 28, 2000
INVENTOR(S)   : Yoshimichi Ohtsuka It is certified that error appears in the above-identified patent and that said Letters Patent is hereby corrected as shown below:

Title page,
Item [54], before "METHOD" insert -- A --

Column 1,
Line 17, after "effects.", change "The similar" to -- Similar --
Line 25, after "example" and before "conventional" insert -- of --

Column 7,
Line 35, after "such as" and before "oscilloscope" insert -- an --
Line 56, after "detected" change "a" to -- the --

Signed and Sealed this

Nineteenth Day of March, 2002

Attest:

JAMES E. ROGAN
Attesting Officer
Director of the United States Patent and Trademark Office